July 1, 1969  H. M. GUETTERMAN  3,452,524
LAWN MOWER WITH YIELDABLY MOUNTED BLADE
Filed April 25, 1966  Sheet 1 of 2
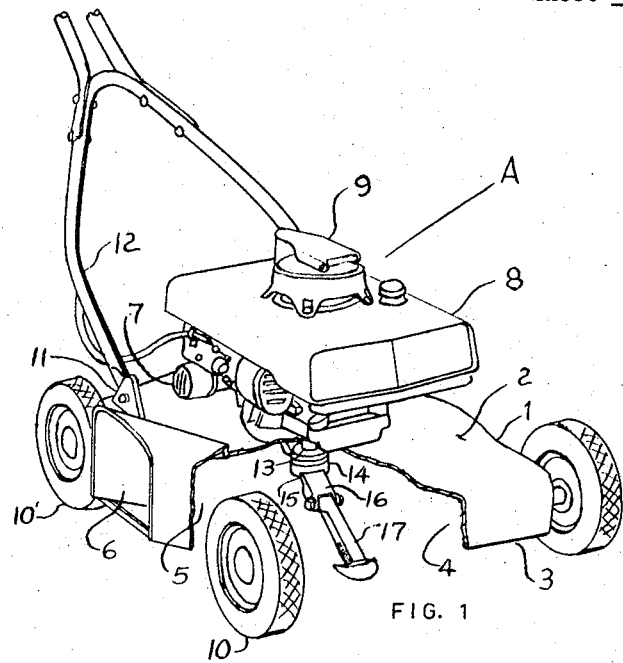
FIG. 1
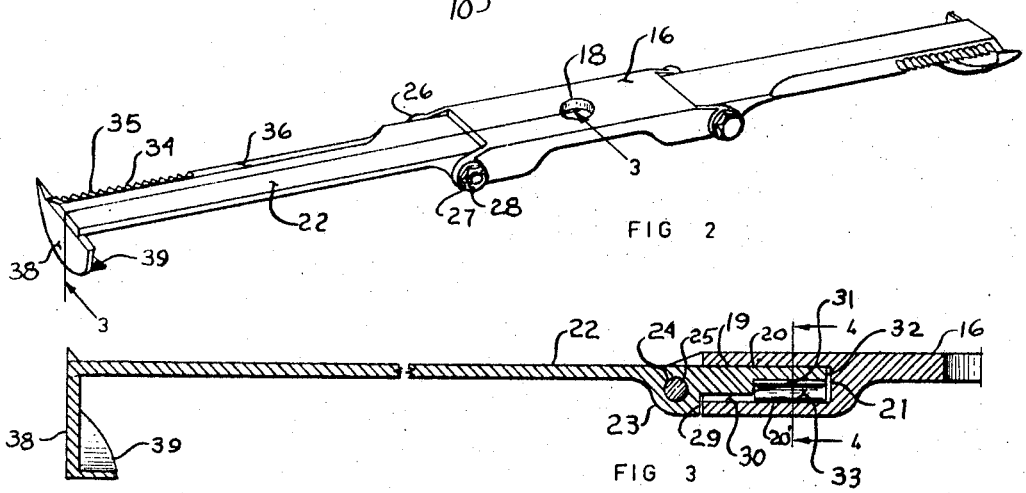
FIG. 2
FIG. 3
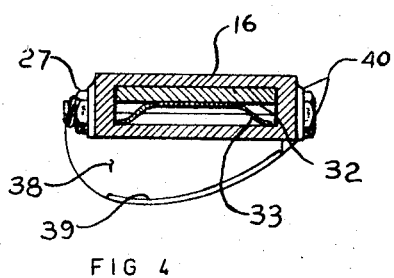
FIG. 4
HENRY M. GUETTERMAN
INVENTOR
BY Ralph N. Kalish
ATTORNEY

HENRY M GUETTERMAN
INVENTOR

BY Ralph W. Kalish
ATTORNEY

United States Patent Office 3,452,524
Patented July 1, 1969

3,452,524
LAWN MOWER WITH YIELDABLY MOUNTED BLADE
Henry M. Guetterman, 5601 Concordia Road, St. Clair, Ill. 62631
Filed Apr. 25, 1966, Ser. No. 545,064
Int. Cl. A01d 55/18
U.S. Cl. 56—295                                    4 Claims

ABSTRACT OF THE DISCLOSURE

A yieldably mounted cutter blade for a power driven rotary lawn mower having a mounting portion adapted for rotation about a vertical axis, a cutter blade being mounted on each end of said mounting portion for extension in opposite directions therefrom, a spring being provided within said mounting portion for urging the received ends of said cutter blades into axially aligned position, and a ground-engaging shoe on the free end of each cutter blade for causing the same to be elevated against the bias of the related spring when said shoe contacts an obstacle within its path of travel.

Background of the invention

This invention relates in general to lawn mowers, and, more particularly, to power driven lawn mowers of the rotary type and having a yieldably mounted blade.

It is an object of the present invention to provide a power lawn mower having a rotary type cutting blade which is adapted to yield upon contact with obstacles in its path during operation so as to be removable from engagement therewith to obviate the projection of such objects from the mower, thereby avoiding injury to the operator or by-standers.

It is another object of the present invention to provide a lawn mower of the type stated, having novel means for floatingly mounting the cutting blade, so that upon impact thereof with an object in the cutting path, the same will be caused to elevate for passing over the object and thereby prevent damage to the cutting blade and other parts of the lawn mower.

It is a still further object of the present invention to provide a lawn mower of the type stated, having yieldably mounted cutting blade which is of two-part construction with each such part being yieldably mounted so that each, independent of the other, may "give" upon contact with foreign objects or other obstacles within the path of the mower.

It is a further object of the present invention to provide a lawn mower of the type stated, which is comprised of a simplicity of parts of durable construction for resistance to breakdown; which incorporates means for rendering the operation of the mower safe, so that accidental personal injury to the operators or individuals in the vicinity is prevented; which is relatively inexpensive in manufacture; and which is reliable and efficient in operation.

Other objects and details of the invention will be apparent from the following description, when read in connection with the accompanying drawings (2 sheets) wherein:

FIGURE 1 is a perspective view of the lawn mower having a yieldably mounted blade constructed in accordance with and embodying the present invention.

FIGURE 2 is a perspective view of the blade and its associated elements.

FIGURE 3 is a longitudinal transverse section taken on the line 3—3 of FIGURE 2.

FIGURE 4 is a vertical transverse section taken on the line 4—4 of FIGURE 3.

Figure 5:
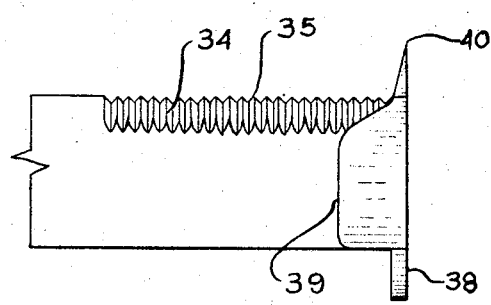
FIGURE 5 is a fragmentary bottom plan view of the blade illustrating the outer extremity of one end portion thereof.
Figure 6:
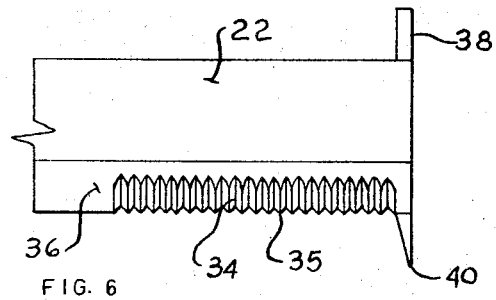
FIGURE 6 is a top plan view of the blade extremity shown in FIGURE 5.
Figure 7:
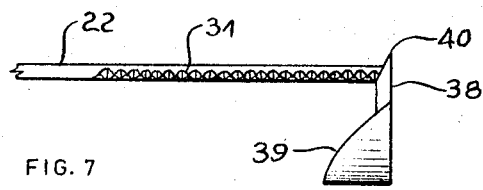
FIGURE 7 is a front elevational view of the blade extremity shown in FIGURE 5.
Figure 8:
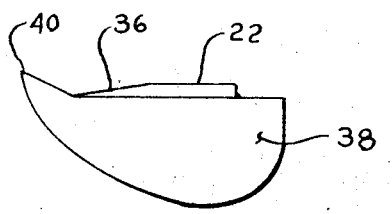
FIGURE 8 is an end view of the blade extremity shown in FIGURE 5.

Referring now by reference characters to the drawings which illustrate the preferred embodiment of the present invention, A generally designates a lawn mower of the power type having a downwardly opening housing 1, as of sheet metal, or the like, said housing having a top or cover portion 2, and a peripherally depending skirt 3 which cooperate to define an open bottomed chamber 4. Formed in one side of skirt 3 is an opening 5 for connecting chamber 4 with a laterally and rearwardly directed discharge duct 6 for cuttings.

Mounted substantially centrally upon covered portion 2 of housing 1, is a conventional gasoline-driven motor indicated generally at 7, having crank shaft (not shown) extending upwardly through a bearing (not shown) provided in the fuel reservoir or tank 8 disposed upwardly of motor 7, wherein the upper end of said crank shaft is connected to a crank member 9 of the type utilized for initiating operation of motor 7. Mower A is rendered mobile by front and rear wheels 10, 10' which are mounted on front and rear axles (not shown) which are journaled within bearings provided in skirt 3 of housing 1. Secured to the rearward portion of housing 1 as by brackets 11 is a frame 12 for supporting a handle (not shown) for steering and directing of mower A during usage.

Motor 7 incorporates a shaft 13 which is vertically presented, extending downwardly through cover portions 2 of housing 1 for projection into chamber 4, and on its lower end carries a friction clutch 14 of well-known character, which latter, at its lower end, is provided with a transverse, downwardly opening groove 15 for receiving the central plate mounting portion 16 of a rotary blade 17; said plate 16 being secured to said clutch 14 by a bolt (not shown) projecting through an aperture 18 in plate 16.

Central plate mounting portion 16 of rotary blade 17 is provided in each of its ends with a pair of end-opening recesses 19, having parallel upper and lower walls 20, 20', and an inner end, vertical wall 21, for receiving the inner end of a cutter arm, designated generally 22, which is normally co-axial with the longitudinal axis of plate 16 and, being elongate and relatively narrow, progresses outwardly therefrom. Each cutter arm 22 is fabricated of durable rigid material, such as steel or the like, and is of plate character, but is thickned or cross-sectionally increased, spacedly from, its inner end, as at 23, for accomodating a transverse bore 24 through which passes a pin 25, the outer ends of which pin extend through suitable openings provided in opposed ears 26, said latter being presented outwardly of the open end of recess 19, on opposite sides thereof; there being a nut and cotter pin, as at 27, 28, on each outer end of pin 25 to prevent accidental displacement of same.

Pin 25 provides a pivot axis for the related cutter arm 22, with respect to the fixedly secured, central plate mounting portion 16. The said thickened portion 23 of each cutter arm 22 is provided with an inwardly directed shoulder 29, abutting against the adjacent lower end face of plate 16 for inhibiting downwardly swinging of the related cutter arm 22 with respect to said plate 16. Shoulder 29 is of greater vertical extent than the thickness of the lower wall 20' of the proximate recess 19 for development of a spacing as at 30, between the lower face 20' of recess 19 and the confronting under portion of the related cutter arm 22 to provide requisite clearance for pivotal movement of said arm 22, as described hereinbelow. At its inner end extremity, each cutter arm 22 is reduced in thickness to provide a shoulder 31 and a terminal tongue 32, the end face of which is immediately proximate wall 21 of the related recess 19. The volume within each recess 19 defined by inner end wall 21, shoulder 31, the under face of tongue 32, and the confronting portion of lower wall 20' provides a receptacle for a leaf-type spring 33 for urging said tongue 32, and hence the inner end of the related cutter arm 22, upwardly into abutment on its upper surface against upper wall of 20 of the respective recess. Said spring 33 is constrained against displacement by the unique relationship of the co-operating surfaces defining the receiving volume.

Each cutter arm 22 upon its leading edge and in the outer portion thereof is provided with a cutting portion as indicated at 34, which comprises a plurality of serrations or cutting teeth 35 arranged in intimate side-by-side relationship, which serrations may be suitably integrated with cutter arm 22 in any desired fashion, such as, for instance, by means of bolts, welding, etc.

The leading edge of each cutter arm 22, adjacent serrations 35, and throughout the substantial portion of the remaining length thereof, is beveled as at 36, being forwardly and downwardly inclinded for streamlining purposes, as will be shown hereinbelow.

Secured, as by welding, bolting, etc. to the under face of the outer end of each cutter arm 22, is an end plate 38 incorporating an inwardly extending, ground-engaging shoe 39. The bottom surface of said plate 38 and shoe 39 is curvate, being formed upon decreasing radii for presenting an upwardly and forwardly sweeping character, with the said plate 38 continuing upwardly and forwardly of said shoe 39 to an apex 40 which latter is presented upwardly and forwardly of the related cutter arm 22.

In operation, crank member 9 is utilized to initiate operation of motor 7, which in turn effects rotation of shaft 13, with consequent rotation of cutter arms 22 at a high angular velocity for effecting a severence of the grass blades within its path, and with such velocity causing a zone of relatively reduced pressure to be developed above the beveled, air foil-acting, edge 36 of cutter arms 22, so that the cuttings will be raised and discharged through duct 6. As shoes 39, together with the adjacent portions of the end plates 38 associated therewith, project forwardly of the respective cutter arms 22, the same will contact any articles or obstacle-forming objectives within the mower's path, before the proximate serrations 35 reach such object. By reason of the unusual configuration of end plates 38 and related shoes 39, such objects, if sufficiently light, may be pushed or brushed tangentially from the path of the cutter arms 22, so as to avoid forceful, perilous propulsion thereby, or if the same are of sufficient weight or rigidly fixed, as through implantation, so as to be resistant to such brushing action, the novel configuration of shoes 39 will cause the latter to ride upwardly, over such object, said shoes acting as cam followers with respect to such object. By such upward "riding" or floating action of shoes 39, the inner, recess-received end of the related cutter arm 22 is caused to rock downwardly about the respective pin 25, and against the bias of spring 33, which latter provides the requisite yieldability for permitting the respective shoes 39 to overpass the relatively immovable object. Upon disengagement of such objects by said shoes 39, by travel thereover, leaf springs 33 through their normal bias will cause the related cutter arms 22 to be returned to normal disposition. It will be seen that by such novel action of cutter arms 22, the danger of any object being projected from the mower under the developed force is obviated. Consequently, the utilization of lawn mower A will assure that operators as well as bystanders will not be subjected to the hazard of grievous bodily harm by reason of rocks and other objects being discharged. Furthermore, the unique spring mounting of the cutter arms 22 will assure longevity to the serrations 35 as the same will yield or "give" when a potentially damaging object lies in their path.

It should be understood that changes and modifications in the formation, construction, arrangement, and combination of the several parts of the lawn mower with yieldably mounted blade may be made and substituted for these herein shown and described without departing from the nature and principle of my invention.

Having thus described my invention, what I claim and desire to secure by Letters Patent is:

1. For use in a mower of the rotary type having a prime mover and a shaft driven by said prime mover, the improvement comprising a mounting plate and a pair of cutter arms, said mounting plate having an endwise opening recess in each of its opposite ends, means for engaging said mounting plate to said shaft for rotation of the same therewith, each of said cutter arms extending from said mounting plate in opposite directions in normally axial alignment, the inner end portions of each of said cutter arms received within the related recess of said mounting plate, means pivotally engaging each cutter arm upon said mounting plate outwardly of the associated recess for swingability of said arms about a horizontal axis, spring means provided within each recess of said mounting plate for urging the inner end portion of each cutter arm upwardly toward the upper limit of the associated recess and hence into axially aligned relationship with said plate, a ground-engaging shoe fixed at the outer end of each of said cutter arms, each shoe having an arcuated bottom edge, each of said cutter arms having a leading edge and a trailing edge, a plurality of serrations provided on each of said leading edges, and said leading edges having beveled portions for streamline purposes.

2. For use in a mower of the rotary type having a prime mover and a shaft driven by said prime mover, the improvement comprising a blade comprising a mounting plate and a pair of cutter arms, means for engaging said mounting plate to said shaft for rotation of the blade therewith, said mounting plate having end-opening compartments, each of said cutter arms having a cross-sectionally increased thickness spacedly from their inner end, each of said cutter arms having a transverse bore extending through said cross-sectionally increased portion, said mounting plate having a pair of longitudinally extending opposed ears disposed outwardly of each open-end recess, said ears having an opening therein, the inner end of each of said cutter arms being received within said recesses, said bore being in registration with the openings in said ears, a pin being received through said openings and said bore for pivotally mounting said cutter arm on said mounting plate, spring means provided within the recesses of said mounting plate for urging the inner ends of each cutter arm into axially aligned relationship with respect to said plate, a ground-engaging shoe fixed at the outer end of each of said cutter arms, each shoe having an arcuated bottom edge.

3. For use in a mower of the rotary type having a prime mover, the improvement comprising a blade member as defined in claim 2 and further characterized by the bottom surface of said ground-engaging shoe being formed upon decreasing radii for presenting an upwardly and forwardly sweeping surface for cam following action with respect to obstacles within the path of such shoe during mower operation whereby upon engagement with an obstacle, said cutter arm will be forced upwardly for pivotal movement around said pin and against the bias of said spring for passing the blade over said obstacle.

4. For use in a mower of the rotary type having a prime mover, the improvement as defined in claim 1 and further characterized by said spring means being a leaf spring for abutment against the undersurface of the inner end portion of the related cutter arm.

(References on following page)

References Cited

UNITED STATES PATENTS

| | | | |
|---|---|---|---|
| 2,697,323 | 12/1954 | Horn | 56—295 |
| 3,013,372 | 12/1961 | Basham | 56—25.4 |
| 3,086,346 | 4/1963 | Zimmermann | 56—25.4 |
| 3,183,655 | 5/1965 | Dunlap et al. | 56—295 |
| 3,184,907 | 5/1965 | Harloff | 56—295 |
| 3,321,026 | 5/1967 | Hubbard | 56—295 XR |

FOREIGN PATENTS 872,372  7/1961  Great Britain.

ROBERT E. BAGWELL, *Primary Examiner.*